Aug. 7, 1956  F. FOERSTER  2,758,276
APPARATUS FOR THE NON-DESTRUCTIVE
TESTING OF MAGNETIZABLE OBJECTS
Filed Jan. 10, 1952

INVENTOR
FRITZ FOERSTER
BY
Pennie, Edmonds, Morton, Barrows and Taylor
ATTORNEYS

United States Patent Office 2,758,276
Patented Aug. 7, 1956

2,758,276
APPARATUS FOR THE NON-DESTRUCTIVE TESTING OF MAGNETIZABLE OBJECTS

Fritz Foerster, Reutlingen, Germany, assignor to Magnetic Analysis Corporation, Long Island City, N. Y., a corporation of New York Application January 10, 1952, Serial No. 265,809

1 Claim. (Cl. 324—34)

The invention relates to a method and an apparatus for the non-destructive testing of magnetizable objects on one hand for cracks, cavities and similar flaws in the material and on the other hand for hardness, strength and composition.

In the non-destructive testing of steel and iron products the magnetic particle method is used extensively. Using this method the objects to be tested, after suitable magnetization, are dusted or wetted with ferromagnetic powder. Proceeding in this manner the powder is collected at the locations of the flaws by the magnetic stray flux present at these locations, and thereby makes such flaws recognizable.

The disadvantages of this method are (1) the impossibility of distinguishing deep cracks from shallow surface defects, (2) the limited depth of the flaws detectable because a certain minimum gradient of the stray flux is needed to collect the powder, and (3) the slow speed of testing.

These disadvantages are avoided in using this invention by quantitatively measuring directly the flaw stray field with help of energization at suitable frequency and a probe arrangement whereby the flaw detection, in contrast to the usually employed particle method, is not dependent upon a minimum concentration of the stray flux. The sensitivity of the quantitative determination of the stray flux can be raised by amplification to practically any desired value, and by employing a suitable acoustic device the size and shape of the flaw can be aurally reproduced in pitch and intensity of sound. The stray flux which appears at the locations of flaws of magnetizable objects preferably after suitable magnetization is, according to the invention, measured quantitatively by means of a microprobe whereby the microprobe produces an electric voltage which is proportional to the gradient of the stray flux, and thereby to the size of the flaw in the material. The measuring microprobe consists of 2 coil assemblies connected together and containing highly permeable cores with low magnetic saturation values, which are energized by an alternating current, and may be connected to an amplifier. Instruments are well known in the prior art which use a transformer including primary and secondary windings wound on a highly permeable core with a saturating alternating current applied to the primary to develop even harmonics in the secondary in proportion to any unidirectional flux. The Beach Patent No. 2,410,039 issued October 29, 1946 and the Beach Patent No. 2,476,273 issued July 19, 1949, for example, show such instruments. Such instruments use measuring units of relatively large dimensions to measure the earth magnetic field or a disturbance of the earth magnetic field, while this invention uses a microprobe the core dimensions of which amount to fractions of a millimeter to a few millimeters only. Through the use of such a small measuring unit it is possible to make a quantitative measurement of a stray magnetic flux the effective range of which for fine seams in a specimen, may amount to approximately 1 mm.

The design of such a microprobe calls for the exact theoretical and experimental clarification of the effect and the operation of a field strength and field strength gradient meter with highly permeable cores. The investigation of the $M^{th}$ harmonic voltage produced by a field strength and field strength gradient meter yields the following relations:

Field strength meter, no load secondary voltage for the $M^{th}$ harmonic (1) $$u_{m_0} = W_2 . \omega . F . \mu_A{}^x . \hat{H}_1 . h_2 . \sin \frac{mH_0}{\hat{H}_1}$$

Field gradient meter, no load secondary voltage for the $M^{th}$ harmonic (2) $$u_{m_0} = W_2 . \omega . F . \mu_A{}^x . \hat{H}_1 . h_2 \cos \frac{2H_0}{\hat{H}_1} . \sin \frac{2H_D}{\hat{H}_1}$$

From this it is seen that the $M^{th}$ harmonic is an even harmonic.

Explanation of symbols $W_2$ = number of turns of secondary
$\omega$ = angular velocity of primary current
$F$ = cross-section of core in millimeters
$\mu_A{}^x$ = initial permeability
$\hat{H}_1$ = excitation field strength for core
$H_0$ = field strength to be measured or average field strength at the gradient meter
$H_D$ = field strength difference $$h_2 = \frac{4}{\pi} . \sin \frac{2H_s}{\hat{H}_1} . \frac{\cos \frac{mH_s}{\hat{H}_s} . \frac{H_k}{H_s}}{1 - \left[\frac{2}{\pi} . \frac{mH_s}{\hat{H}_1} . \frac{H_k}{H_s}\right]^2}$$

$H_s$ = saturation field strength
$H_k$ = distortion or curvature field strength Referring now to the accompanying drawing.

Figs. 3, 4, 5, 6, 7 schematically depict alternative coil positions used in detecting flaws.

Figure 8:
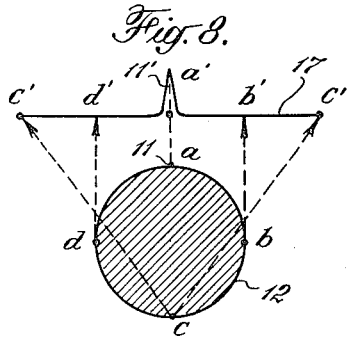

Fig. 8 is a representation of an oscilloscope pattern controlled by a microprobe which repetitively describes a path adjacent the periphery of a test piece at a fixed cyclic rate.

One of the conditions which is particularly important for the reliable operation of the meter which indicates field strength or field gradient, is proportionality between the field strength, or the field strength gradient and resultant voltage. To obtain this condition it is necessary that:

(3) $$\hat{H}_1 \geq 1.5 H_s$$

Figure 1:
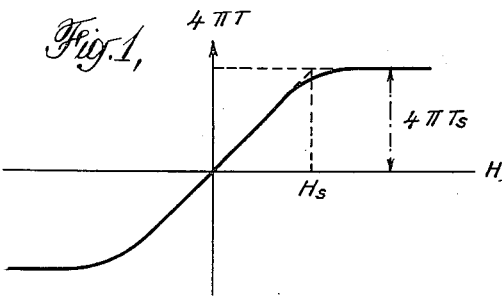
Fig. 1 is a graphic representation of the ideal magnetization curve of a microprobe coil core.

Figure 1 shows the ideal magnetization curve of coil core. The permeability $\mu_A{}^x$ is given by (4) $$\mu^x A = \frac{4\pi T_s}{H_s}$$

where $4\pi T_s$ is the saturation magnetization

From Equation 3

(5) $$\hat{H}_1 \geq 1.5 . \frac{4\pi T_s}{\mu_A{}^x}$$

The apparent permeability $\mu_A{}^x$ for heavy demagnetic (short core) is dependent only upon the geometrical dimensions and not the material itself. For short cores the permeability may be written:

$$(6) \quad \mu^x = \frac{\frac{\pi}{4} \cdot \frac{L^2}{F}}{\frac{1}{2} ln \frac{\pi}{4} \cdot \frac{L^2}{F} - 9.31} \cdot \mu_0$$

Equation 6 for short core length can be replaced by the approximate equation $$(7) \quad \mu^x = \frac{1}{5} \cdot \frac{L^2}{F} \cdot \mu_0$$

where $L$ = length of core in millimeters
$\mu_0$ = constant of induction

Combining Equations 5 and 7

$$(8) \quad \hat{H}_1 = \frac{0.4\pi \cdot W_1 \cdot \hat{i}}{l} \geq \frac{7.5 \cdot 4\pi \cdot T_s}{L^2 \cdot \mu_0}$$

$W_1$ = number of turns of primary
$l$ = length of coil winding
$\hat{i}$ = strength of primary current In addition it is necessary to compute a certain maximum number of turns which must not be exceeded because the size of the wire is limited on one hand by the resultant heating when the wire diameter is decreased, and on the other hand by the required restriction of the coil dimensions when length of the wire is increased.

The required ampere turns per cm. winding length as a function of the core length L can be computed from Equation 8.

$$(9) \quad \hat{i} \cdot \frac{W_1}{l} \geq \frac{T_s}{L^2 \cdot \mu_0} \cdot 7.5$$

Equation 9 states that reducing the core length L for instance to ½ must increase the current for a fixed number of turns per cm. winding four times to satisfy Equation 3. Quadrupling the current means increasing the heat losses 16 times. Equation 9 states that for a given core material a low limit exists for the shortening of the probe length by the heat loss.

By means of these computations and considerations it is possible to establish the most favorable design and arrangement of the probe. Particularly it can be stated that microprobes without excessive heat losses can only be produced with help of materials which have a very low saturation value $T_s$. By suitable addition of non-ferromagnetic alloy components of the core material of the invention it is possible to produce core materials with very low values of saturation magnetization. The alloy known as "Permalloy" is one such materials with low saturation values is it possible to manufacture microprobes the dimensions of which are comparable with the effective extensions of the magnetic stray fields which occur at the surface of flaws on ferrous materials.

Using a microprobe of this invention it is possible to measure quantitatively magnetic stray fields (gradients) which for suitably magnetized specimens, occur at such locations where the uniformity of the material has been disturbed by cracks, inclusions or cavities. It is immaterial as to the manner in which the specimen is magnetized, as long as a component of the magnetic flux is right angles to the defect, is of sufficient strength, and exists long enough to permit subsequent measurement inspection by the microprobe. For many objects such rods and tubes it is convenient to pass a heavy direct current longitudinally through the specimen for an instant. If the current runs parallel to the flaw, the resulting residual magnetic field will be transverse to the flaw.

The effective penetration, viz., detection depth, when using the microprobe is about 10 times greater than for the already mentioned magnetic particle method existing previously employed, because the microprobe of the invention responds to more gradual gradients than does the magnetic particle test. Usually the deeper the flaw the more gradual the gradient.

Another advantage of the invention is the fact that the microprobe can be effectively adapted to the test specimen for various test purposes on one hand by suitably arranging the two separate test coil assemblies with regard to each other and on the other hand by suitably disposing the probe itself with regard to the test specimen.

Figure 2:
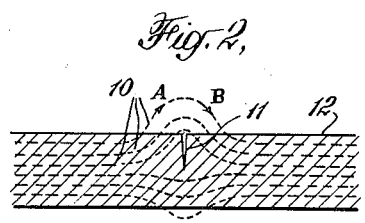
Fig. 2 is a representation of a fixed polarity magnetic field adjacent to a flaw in a test piece.

Fig. 2 is a schematic picture of a fixed polarity stray magnetic field 10 at the location of a flaw 11 in the material being tested 12. This field at point A has an opposite gradient compared to point B. Using a gradient microprobe a stray flux with flow characteristic is indicated because the microprobe reacts only upon stray fluxes which change their direction, as at point A and B, with respect to the two pickup or detecting coils.

Figure 3:
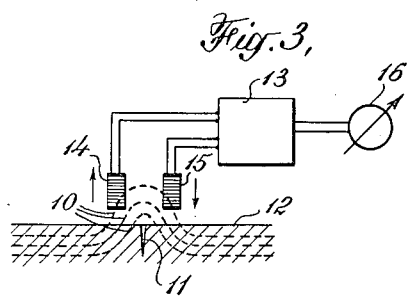
Figure 9:
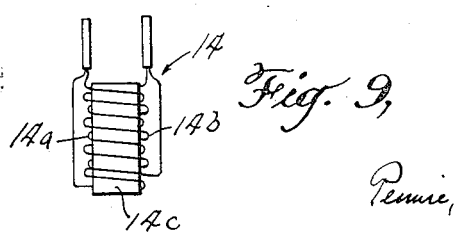

Figure 3 shows a gradient microprobe 13 located above the flow 11 with parallel arranged coil sets or assemblies 14 and 15 perpendicular to the surface of the test object 12. In this combination the tangential gradient of the normal or perpendicular field is measured because the probe only measures fields or field gradients which lie in the longitudinal direction of the probe in this case the direction normal to the test piece 12. As diagrammatically illustrated in Figure 9, the coil assembly 14 comprises primary and secondary coils 14a and 14b wound on a core 14c of magnetic material. The microprobe 13 includes means connected to the primary winding 14a for passing an alternating current therethrough and means for responding to an even harmonic voltage component developed in the secondary winding 14b. The coil assembly 15 is of identical construction and the even harmonic voltage components developed in the secondary windings of the assemblies 14 and 15 are compared and applied to an indicator 16. Such an arrangement is well known in the prior art and for that reason it is not illustrated in detail. As above indicated the primary currents should have peak values at least 1.5 times those required to saturate the cores. The cores should be of high permeability material having a low saturation flux density with dimensions of the order of fractions of a millimeter to a few millimeters. As also indicated above, the core should be short for heavy demagnetization and hence should have a short length relative to the transverse dimensions thereof.

Figure 4:
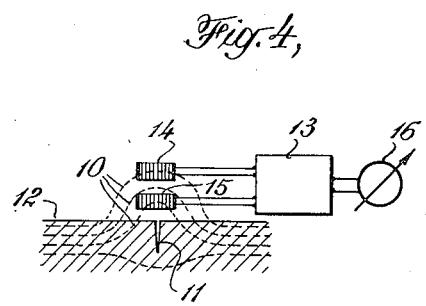

Fig. 4 shows a probe arrangement with the transformer coils 14 and 15 located above each other parallel to the surface of the test piece 12. Such an arrangement is particularly suited for the measurement of stray fields 10 which are caused by internal stresses and structural defects such as soft spots, stray fields parallel to the surface and so on (as represented at 11).

Figure 5:
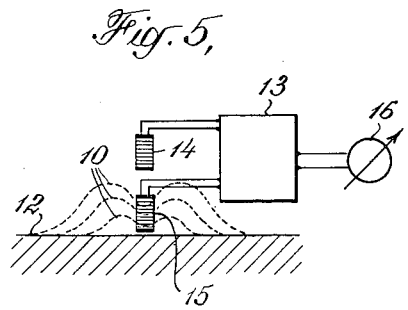

One application of the microprobe for the measurement of the vertical gradient of the vertical component (of a stray field 10) is illustrated by Fig. 5. Here, the probe 13 is disposed normal to the surface of the test piece 12 with the sets of coils 14 and 15 arranged coaxially above each other. This third arrangement is used for the so-called "magnetic point" method. In this case, according to the invention, a suitably formed magnet, the pole of which is sharply pointed, is pressed against the specimen and after removal thereby forms in the specimen a point type magnetic pole the strength of which is only dependent upon the coercive force due to the high demagnetizing effect of the free surface. The strength of the resulting residual pole and thereby the coercive force (vertical gradient of the vertical component) is then measured by means of the apparatus 18, 16 above described.

The arrangement of the microprobe 13 above a "magnetic point" induced in the test specimen 12 therefor permits the measurement non-destructively, and independent of the shape of the test specimen 12, of an important material characteristic and in this manner to evaluate hardness, depth of case and grade. The specific shape of the specimen 12 is of no importance in this case because the area extension of the point pole is insignificant compared with dimensions, curvatures, etc. of the work specimen 12. The point magnetization in addition permits the measurement of the mentioned properties at different spots of the same specimen. Inductively hardened parts like car axles, steering wheel shafts and so on thus can be investigated in this manner for soft spots.

In the same way according to the invention it is possible to employ the probe for the rapid measuring of the residual magnetism remaining in a test piece after magnetization. To do this it is only necessary to move the magnetized specimen past the probe at a fixed distance. The magnetic field of the test specimen at the location of the probe is determined by the volume of the test specimen and its coercive force. In view of the fact that the coercive force is proportional to the hardness of many technical alloys it is possible to build, with help of the probe referred to in this invention, various apparatuses which permit a fully automatic sorting according to hardness of steel parts like drills, rollers, nuts, needles and the like. For this purpose the magnetized parts to be tested are moved past the probe either by means of a moving belt or by sliding them down a V-shaped incline and after measurement are automatically graded into hardness groups by means of traps which are controlled by the measured value. To do this, the probes have to be displaced in such combinations that the magnetic field of the earth has no effect upon the measurements. This can be done by means of two specific probe orientations.

Figure 6:
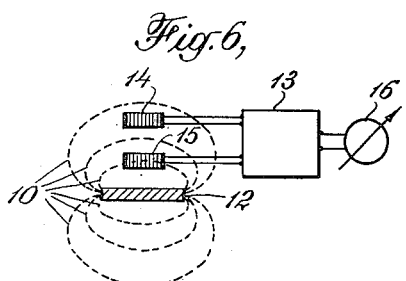

The first possibility is illustrated by Fig. 6. The two sets of coils 14 and 15 are disposed above each other parallel to the surface of the specimen 12 in such connection that a homogeneous earth magnetic field is eliminated. On the other hand, the effect of the specimen 12 is much stronger upon secondary coil 15 than upon secondary coil 14 with the result that the probe 13 causes the indicator 16 to deflect for non-uniform hardness or for non-uniform properties of the material.

Figure 7:
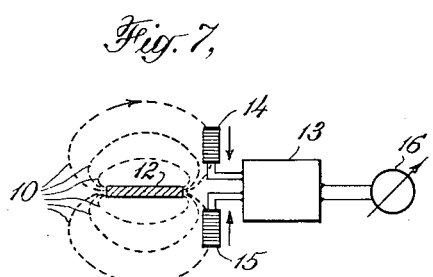

Fig. 7 shows the second possibility of coil orientation for the residual field test where the coercive force is a measure of the hardness, and so on, of the test specimen. The two sets of coils 14 and 15 in this case are located coaxially on both sides of the front end of the test specimen 12 connected in opposition so that the effect of the homogeneous earth magnetic field is eliminated. On the other hand, the effect of the test specimen 12 upon the two secondary coils 14 and 15 is additive because the field 10 of the test specimen has a reversed direction at the location of each coil. The probe 13 is reacted upon by such gradient fields but not by the earth's magnetic field which has the same direction and strength at the location of each coil. This is true with respect to the embodiments illustrated in the other figures as well.

The scanning of rotationally symmetrical work pieces (bars, tubes, and so on) by means of the microprobe of this invention suitably arranged can be accomplished in considerably shorter time if the microprobe is mechanically rotated with high speed adjacent to the circumference or periphery of the test specimen. In testing a hollow workpiece, the microprobe may be mechanically guided to describe a path adjacent the periphery of the workpiece, either inside or outside the piece. In this embodiment the microprobe coils may be the same as those in the other embodiments, viz., a microprobe as above described is caused to rotate around inside or outside of the test specimen and therefore the pair of detecting or secondary coils periodically pass the flaw in one plane, as the material moves past the rotating microprobe in another plane, thus scanning all parts of the flaw. Since the primary and secondary coils revolve, suitable means must be provided for connecting them to the stationary leads to the oscillator and amplifier in box 18. Such means are known in the art, but a transformer having one rotating winding and one stationary winding is preferred for each connection. Proceeding in this manner the circumference of the test piece is reproduced by the horizontal voltage of a cathode ray tube connected at 16 so that every spot of the circumference of the test specimen is correlated with a specific point of the horizontal line of the cathode ray tube screen. To effect such correlation it is necessary only to generate a synchronizing signal at each revolution of the microprobe and to initiate the horizontal sweeps of the cathode ray beam by these signals. By suitable amplification and shaping of the signals, these signals themselves may comprise the horizontal sweep voltage. One means for generating such synchronizing signals is to rotate with the microprobe a small permanent magnet past a stationary pickup coil connected through a shaping circuit and amplifier to the horizontal deflection electrodes of the cathode ray tube. The stray fields measured by the microprobe rotating around the test specimen are reproduced as vertical deflection of the electron beam. The scanning takes place at a rate of 25 to 30 repetitions per second and produces upon the screen of the cathode ray tube a stationary pattern of all flaws which are encountered on this circumferential section of the test specimen. If the test piece moves through the measuring combination containing the rotating microprobe then there will appear upon the screen the various flaws of the test specimen while simultaneously the various flaw-induced voltages may control a relay which operates a signal, either audible or visual, if the flaw exceeds an arbitrarily fixed magnitude.

Fig. 8 is the flaw picture on the screen of a cathode ray tube where the circumference of the test specimen 12 appears as a horizontal line 17. Every point of the circumferential section of the test specimen $(a, b, c, d,)$ is represented by a related point $(a', b', c', d')$ on the horizontal line of the oscilloscope picture and in this way the location of the flaw 11 is fixed. The depth represents the magnitude of the flaw 11 and corresponds to the amplitude of the indicated deflection 11' while the shape and the extension of the flaw 11 is characterized by the shape of the deflection 11' above the horizontal 17.

The particular technical progress claimed in this invention relates to the fact that a so-called "Flaw-Vision-Picture" on the screen of the cathode ray tube shows simultaneously (1) the location,
(2) the magnitude (depth), and
(3) the extension viz., shape of the flaw as a quantitative oscilloscope pattern of the circumferential cross-section of the test specimen at that instant lying in the rotational plane of the microprobe. The "pip" of the oscilloscope pattern may be caused to appear at the center of the sweep when the defect is facing the front of the apparatus, as shown in Fig. 8 for example, by angularly adjusting the position of the mentioned stationary pickup coil in which the synchronizing signal is generated.

In the same manner it is possible to test small parts like nuts, rollers, rings and so on, by first magnetizing them, as above described, and then disposing them over a table under which a microprobe is rotating. If one of these parts as disposed on the axis of rotation of the microprobe contains a flaw, then the resultant magnetic stray field affects the microprobe and is reproduced on the screen of the cathode ray tube in the manner mentioned above. The measured voltage at the same time can be employed to automatically sort or eliminate defective parts by means of relay controlled operations.

An important requirement using the probe of this invention for the non-destructive testing of magnetizable material is the elimination of the effect of the earth's magnetic field upon the measurements. To accomplish this it is necessary that the performance of the two coils of the probe should be exactly identical. One requirement for this is that the coils should be identical regarding their electrical and physical properties and they are disposed exactly parallel or coaxial to each other. A microprobe designed along these lines is suited for various other purposes in addition to the applications already mentioned.

I claim:

In a magnetic field measuring instrument, a core of high permeability magnetic material having a low saturation flux density and a short length relative to the transverse dimensions thereof with a maximum dimension of the order of fractions of a millimeter to a few millimeters, primary and secondary windings on said core, means for applying to said primary winding alternating current having a peak valve at least 1.5 times that required to produce saturation of said core, and means coupled to said secondary winding and responsive to at least one even harmonic of the alternating current applied to said primary winding.

References Cited in the file of this patent

UNITED STATES PATENTS

| | | |
|---|---|---|
| 2,390,051 | Barth | Dec. 4, 1945 |
| 2,406,870 | Vacquier | Sept. 3, 1946 |
| 2,418,553 | Irwin | Apr. 8, 1947 |
| 2,519,367 | Gunn et al. | Aug. 22, 1950 |
| 2,581,209 | Shepard et al. | Jan. 1, 1952 |